March 24, 1964

A. H. RICHARDSON ETAL
AUTOMATIC WEIGHING AND FLOW CONTROL
APPARATUS FOR SOLID MATERIALS 3,126,068

Filed April 3, 1961

INVENTORS
ALAN H. RICHARDSON
JOHN H. CARROLL

Thomas J. O'Brien
ATTORNEY

March 24, 1964        A. H. RICHARDSON ETAL        3,126,068
           AUTOMATIC WEIGHING AND FLOW CONTROL
                 APPARATUS FOR SOLID MATERIALS
Filed April 3, 1961                              2 Sheets-Sheet 2

INVENTORS
ALAN H. RICHARDSON
JOHN H. CARROLL
BY
ATTORNEY 3,126,068
AUTOMATIC WEIGHING AND FLOW CONTROL APPARATUS FOR SOLID MATERIALS
Alan H. Richardson, Kingsville, and John H. Carroll, Ashtabula, Ohio, assignors to Union Carbide Corporation, a corporation of New York
Filed Apr. 3, 1961, Ser. No. 100,459
4 Claims. (Cl. 177—108)

The present invention relates to apparatus for continuously controlling and measuring the flow of solid material from lime kilns and the like.

The previously known methods and apparatus for controlling the flow of lime from vertical calcining kilns, while successful to some extent, were never completely satisfactory in providing accurate total information regarding kiln production. Accordingly heat balances, product quality, inventories, and production costs estimated from this data were never accurate to the desired extent.

It is an object of this invention to provide an apparatus which will ensure superior accuracy in the measurement and control of the flow of lime from calcining kilns.

It is another object of this invention to provide an apparatus for measuring and controlling the flow of solid granular material.

These and other objects will be apparent from the following description and claims, taken in conjunction with the drawing in which:

The following description of the invention is particularly directed to the measurement and control of hot granular lime from vertical calcining kilns. However, it is to be understood that the present invention can be employed in other processes for the measurement and control of the flow of solid granular material.

The objects of the present invention are achieved by an apparatus comprising a bucket-type receptacle having a pivoted invertible portion which can be rotated to empty the bucket of any contained granular, solid material. Emptying and re-closing of the receptacle is accomplished by means of an electrically controlled force transmitting means which is coupled to the invertible portion of the receptacle. The receptacle is mounted on a lever arm, which in turn is pivotally mounted on a pedestal. The receptacle is located to receive granular, solid material, e.g. hot, granular lime, from a calcining kiln by way of a vibrating feeder or other suitable gating mechanism. A metallic deformable member is connected to the lever arm on the opposite side of the pivot from the receptacle to provide a downward restraining force on the lever arm to maintain the lever arm in a substantially horizontal position when the receptacle is empty and also when the receptacle is receiving lime from the kiln. The weight of the material delivered from the kiln to the receptacle produces a corresponding deformation in the deformable member. An electrical switch is coupled to the deformable member and is adapted so that whenever the deformation of the deformable member reaches a predetermined value, corresponding to a specific amount of lime in the receptacle, the electrical switch will respond to this deformation and assume a new position. When the electrical switch assumes this new position an operational cycle is sequentially promoted whereby (1) the electrically actuated mechanism withdrawing lime from the kiln is caused to be deactuated, and the lime is held in the kiln; (2) the electrically controlled force transmitting means is actuated to adjust the invertible portion of the receptacle to discharge the lime contained therein onto a conveyor or other suitable means; (3) the electrically controlled force transmitting means is then actuated to return the invertible portion of the receptacle to its initial position and; (4) the withdrawal of lime from the kiln is resumed and the cycle repeated.

Figure 1:
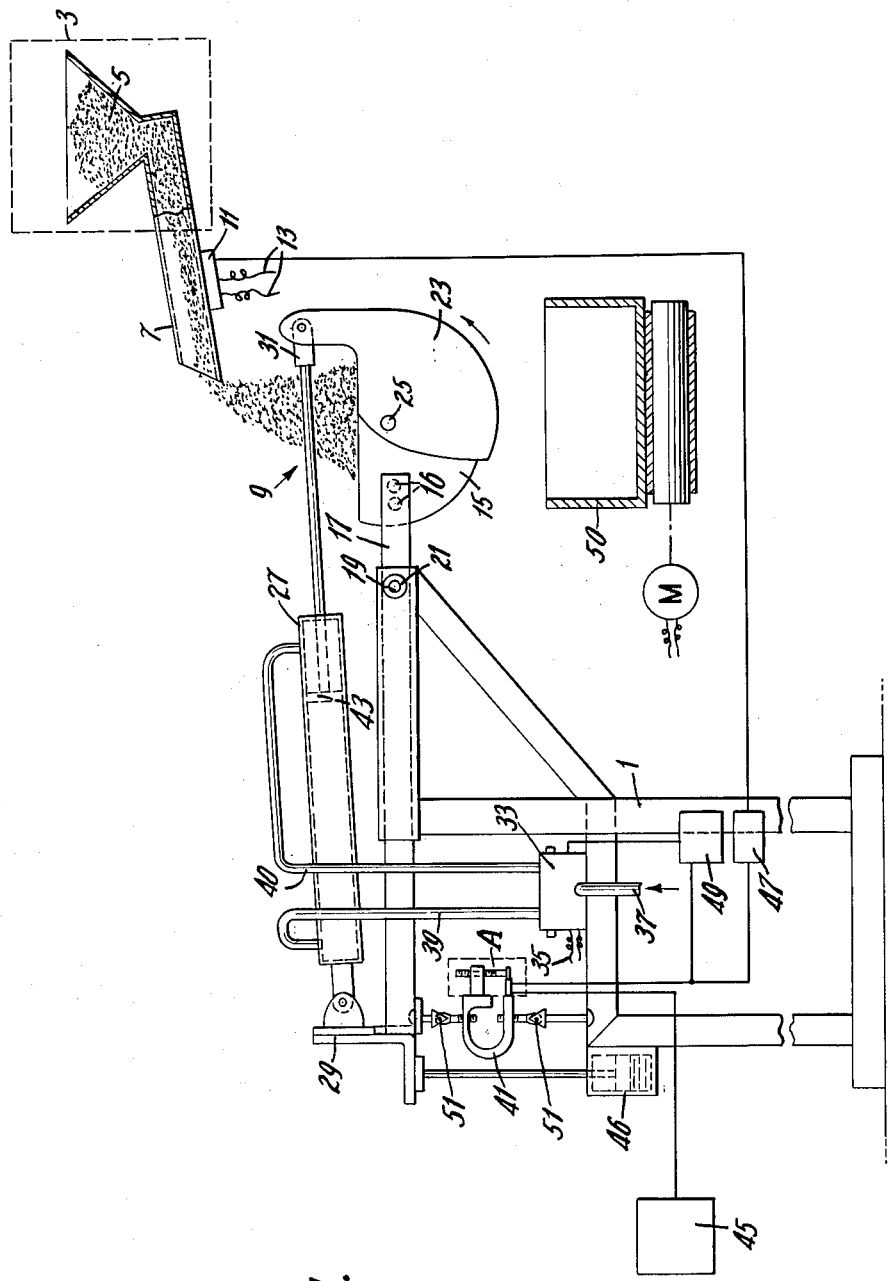
FIGURE 1 shows an elevation view of the apparatus of the present invention.
Figure 2:
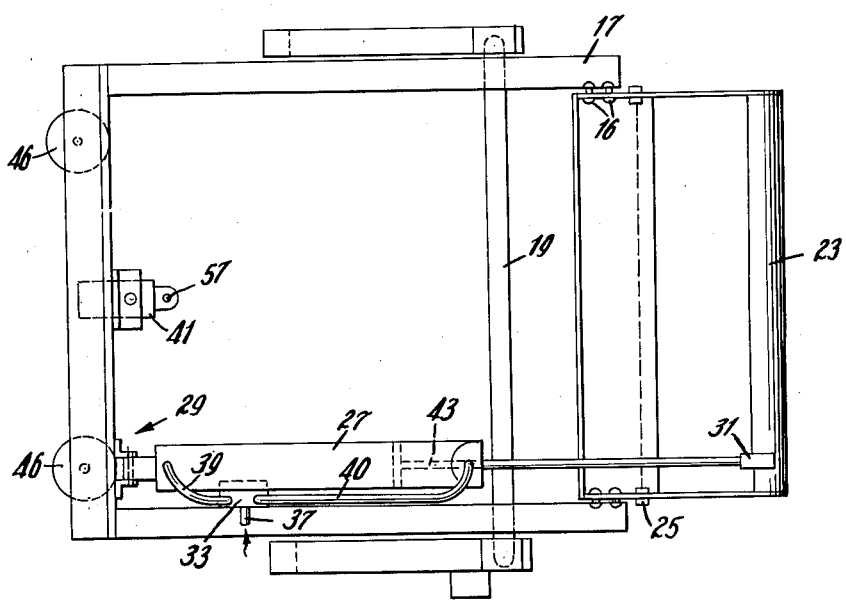
FIGURE 2 shows a plan view of the apparatus illustrated in FIGURE 1.

With reference to FIGURES 1 and 2 of the drawing, a pedestal 1, or base member, is positioned adjacent a schematically represented calcining kiln 3 containing hot granular lime 5. The lime is conducted from the kiln along a suitable chute 7 to receptacle 9 by means of an electrically operable vibrating feeder 11. The vibrating feeder 11 is electrically energized from a suitable source through conductors 13 and is arranged to act as a gating mechanism; e.g., when the feeder is deactuated, the lime is withhheld in the kiln. The lime which is withdrawn from the kiln by the operation of the feeder is deposited in the receptacle 9. The stationary portion 15 of receptacle 9 is fixedly mounted by rivets 16 to a lever arm 17 at a predetermined distance from shaft 19. Shaft 19 constitutes the lever arm pivot and is provided with antifriction bearings 21. The invertible portion 23 of the receptacle 9 is rotatably mounted on the fixed portion of the receptacle by means of shoulder bolts 25 and is adjustable to be rotated by force transmitting means 27 to cause opening, and thus emptying, of the receptacle. Force transmitting means 27 is shown as a double acting air power cylinder engaged to the lever arm by clevis mounting plate 29 and to the movable portion 23 of the receptacle 9 by means of a clevis rod-end, pin and bearing arrangement indicated as 31. Force transmitting means 27 is electrically controlled by a conventional electrically operated valve 33 which can for example, be of the "4-way" solenoid type and which is connected to a suitable electrical source (not shown) through conductors 35. In general, a particular electrical signal applied to the electrically operated valve 33 will cause pressurized air to pass through hose 37 to only one of conduits 39 and 40, and a change in the electrical signal applied to valve 33 will cause pressurized air to flow only through the other conduit thereby providing in the present instance, alternate opening and closing of the receptacle 9 through the movement of piston 43. When pressurized air in introduced into conduit 39, receptacle 9 is closed, and when introduced into conduit 40 receptacle 9 is opened. The operation of electrically operable valve 33 can thus be controlled simply by means of a conventional relay device or other similarly functioning element suitably connected in the actuating circuit of the valve.

The pivotally mounted lever arm 17 is coupled, at a predetermined distance from its pivot, to a deformable metallic member 41 which is also coupled to pedestal 1. The deformable member 41 is positioned to provide a vertical deformation proportional to any upwardly directed force acting thereon. Additionally, deformable member 41 is arranged and designed so as to maintain the pivotally mounted lever arm at all times in a substantially horizontal position regardless of the amount of material in the receptacle. In this way, the sensitivity of the apparatus is maintained substantially constant and further, the filling and emptying of the receptacle is thereby made more efficient and convenient. Oil-filled dashpots 46 are provided to dampen the impact of large particles of lime and to reduce any tendency toward underweight batches caused by large particle impact. An electrical switch, indicated generally as A, is mounted on the deformable member 41 and is adjustable to be responsive to a predetermined deformation of the deformable member. Switch A is connected in circuit with a suitable source of electrical energy 45 and also with time-controlled electrical elements 47 and 49. Time-controlled elements 47 and 49, which constitute what are known in the art as "timing-relays," are connected in circuit with feeder 11 and electrically actuated valve 33 respectively.

The operation of the apparatus of the present invention is as follows: Receptacle 9 is maintained in a closed position by means of force transmitting means 27 which receives pressurized air through electrically operable valve 33, and hot granular lime is continuously fed into the closed receptacle by means of feeder 11. Deformable member 41, due to the force exerted thereon by the receptacle and any lime contained therein, expands in proportion to the amount of lime in the receptacle. Switch A, which is coupled to the deformable member, is adjusted whereby when the deformation of the deformable member reaches a value corresponding to a predetermined weight of lime, the switch changes from its original position to a new position. When switch A assumes this new position, an electrical signal is conducted from source 45 through switch A and "timing-relays" 47 and 49. Timing relay 47, in response to the change in position of switch A, causes feeder 11 to be immediately de-energized and to remain de-energized for a definite period of time thereby discontinuing passage of lime from the kiln 3. Subsequently, and while feeder 11 is de-energized, "timing-relay" 49, in circuit with electrically operable valve 33, causes the valve to introduce forced air through conduit 41 to thereby open the receptacle and empty the contained lime into a suitable conveyor 59; after a time interval sufficient to permit emptying of the receptacle, "timing-relay" 49 causes valve 33 to introduce forced air through conduit 39 and the receptacle is thereby re-closed. Feeder 11 remains de-energized for a fixed time interval sufficient for the emptying and reclosing of the receptacle by virtue of the characteristics of "timing-relay" 47. After the elapse of this fixed time interval, "timing-relay" 47 causes the feeder 11 to be re-energized and the cycle is repeated. By simply connecting switch A to a conventional electrical counter mechanism, the total amount of lime withdrawn from the kiln can be automatically and continuously obtained. Alternatively, "timing-relay" 47 can be adjusted or designed to actuate the feeder 11 at regular intervals e.g. every 20 seconds, and thereby provide a constant rate of lime withdrawal from the kiln. However, the time interval must be at least equal to the period of a full weighing cycle.

A typical operating cycle of the latter arrangement is as follows:

Time:
    (1) 0 to 6 seconds_____ Bucket filling (feeder actuated).
    (2) 6 to 11 seconds____ Bucket dumping and returning (feeder deactuated).
    (3) 11 to 20 seconds___ Bucket waiting for fill (feeder deactuated).

The first element of the cycle will vary from operation to operation, depending on feed rates, densities, etc., but the total period can remain fixed by control of timing-relay 47.

In the practice of the present invention, in conjunction with a vertical lime kiln, employing the above mentioned cycle, 246 consecutive batches were check weighed on a commercial platform scale, and the average of each sequence of six batches was also calculated to provide 41 sub-averages for comparison with the composite average. Eighteen (18) of the six group averages were higher than, twenty (20) were lower than, and three (3) were coincident with the composite average. The average deviation was 0.467 lb. and the maximum deviation was 1.44 lbs. The operating times for the 246 and six cycle operations were 82 minutes and 2 minutes respectively.

Figure 3:
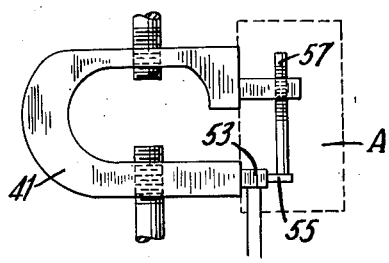
FIGURE 3 shows a deformable metallic member employed in the apparatus of the present invention as a weighing element.

The deformable member 41 and the switch A connected thereto, are more specifically illustrated in FIGURE 3. As shown in FIGURE 3, deformable member 41 is preferably formed of a U-shaped loop of metal such as steel. The loop is designed and mounted so that the vertical force exerted by the lime in the receptacle produces a relatively small but accurately proportional vertical deformation in the loop. The metallic loop is maintained in a suitable vertical position by means of self-aligning bearings 51 shown in FIGURE 1. One arm of the loop is fixed to a conventional limit switch type contacting mechanism 53 having a spring-loaded toggle arm 55, and the other arm of the loop is fixed to a threaded vertically adjustable actuating member 57. Actuating member 57 can be raised or lowered relative to the limit switch and is positioned initially to seat against toggle arm 55 to prevent it from moving the limit-switch from its initial position until the deformation of the metallic loop reaches a predetermined value. By raising or lowering the actuating member 57 the limit switch can be made responsive to different specific deformations of the metallic loop, i.e. different weights of lime. Accordingly, the apparatus of the present invention can be readily adapted to provide various controlled rates of lime withdrawal. While the above-described metallic loop and switch arrangement is preferred, other devices, such as pneumatic and hydraulic load cells, can be suitably employed in the apparatus of the present invention.

The apparatus described hereinabove is a compact, simple and useful device having a high degree of accuracy and dependability for measuring and controlling the flow of lime from calcining kilns. It thus represents a beneficial contribution to the art by providing a means by which the efficiency and overall knowledge of lime production may be materially increased.

What is claimed is:

1. An apparatus for controlling and measuring the amount of solid granular material withdrawn from a structure containing such material which comprises, in combination, gating means operably connected to said structure for providing continuous passage of granular solid material therefrom and being adjustable to be de-actuated whereby the solid material is caused to be retained in the structure while said gating means is deactuated; a receptacle disposed to receive the solid material as it is withdrawn having a movably mounted member normally closing said receptacle, said member being adjustable to open the receptacle and thereby cause any solid material contained in the receptacle to be emptied therefrom; a base member; a lever arm pivotally mounted on the base member and supporting said receptacle at a predetermined distance from the axis of rotation of said lever arm; a deformable member coupled between said lever arm and said base member at a fixed distance from the axis of rotation of said lever arm and on the opposite side of the lever arm pivot from the receptacle, said deformable member being deformable in proportion to the weight of lime in said receptacle and arranged to maintain the lever arm in a substantially horizontal position; force transmitting means located on the opposite side of the lever arm pivot from said receptacle, operably coupled to said movable receptacle member through an actuating arm and normally closing said receptacle by exertion of a positive force on said movable receptacle member through said actuating arm, said force transmitting means being adapted to be actuated to cause movement of said movable receptacle member by virtue of a positive force exerted thereon through said actuating arm to provide opening and subsequent re-closing of the receptacle; and means engaged to said deformable member and located on the same side of the lever arm pivot therewith, said last mentioned means being responsive to a predetermined deformation of said deformable member for temporarily deactuating said gating member when said deformable member experiences said predetermined deformation and for actuating said force transmitting means to cause emptying and re-closing of said receptacle while said gating means is deactuated.

2. An apparatus for continuously controlling and measuring the amount of solid material withdrawn from a structure containing such material which comprises, in combination, electrically actuated gating means operably connected to said structure for providing continuous passage of solid granular material therefrom and being adjustable to be deactuated whereby the solid granular material is caused to be retained in the structure while said gating means is deactuated; a receptacle disposed to receive the solid material as it is withdrawn from the structure having a movably mounted member normally closing said receptacle, said member being adjustable to open the receptacle and thereby cause any solid material contained in the receptacle to be emptied therefrom; a base member; a lever arm pivotally mounted on the base member and supporting said receptacle at a predetermined distance from the axis of rotation of said lever arm; a deformable metallic member coupled between said lever arm and said base member at a fixed distance from the axis of rotation of said lever arm and on the opposite side of the lever arm pivot from the receptacle, said deformable member being deformable in proportion to the weight of solid material in said receptacle and at all times maintaining a downward force on the lever arm whereby said lever arm is continuously maintained in a substantially horizontal position; force transmitting means located on the opposite side of the lever arm pivot from said receptacle operably coupled to said movable receptacle member through an actuating arm and normally closing said receptacle by exertion of a positive force on said movable receptacle member through said actuating arm, said force transmitting means being adapted to be electrically actuated to cause movement of said movable receptacle member by virtue of a positive force exerted thereon through said actuating arm to provide opening and subsequent re-closing of the receptacle in response to an applied source of electrical energy; electrical switch means, in circuit with a source of electrical energy, engaged to said deformable member and located on the same side of the lever arm pivot therewith having a normal first position and being adapted to change to a second position in response to deformation of the deformable member only when said deformation reaches a predetermined value, said switch also being adapted to return to its first position whenever the deformation of said deformable member is less than said predetermined value; a first electrically operable time controlled element in circuit with said switch and said electrically actuated gating means to deactuate said gating means only for a predetermined period of time when said switch assumes its second position due to deformation of the deformable member; and a second electrically operable time controlled element in circuit with said switch and said electrically actuated force transmitting means to cause said force transmitting means to open said receptacle when said switch assumes its second position and to close said receptacle before said gating means is reactuated said time controlled elements being arranged on the same side of the lever arm pivot as said deformable member.

3. An apparatus in accordance with claim 1 wherein said deformable member is a U-shaped steel loop disposed in a vertical plane with the parallel sides of said U-shaped loop extending in a horizontal direction.

4. An apparatus in accordance with claim 1 wherein said deformable member is a U-shaped steel loop disposed in a vertical plane with the parallel sides of said U-shaped loop extending in a horizontal direction, and wherein said electrical switch means comprises a spring loaded contact member and an actuating member, said contact member being fixedly mounted to one of the parallel sides of said U-shaped loop and said actuating member being fixedly mounted to the opposite side of said U-shaped loop, being movable with respect to said contact member upon deformation of said U-shaped member; said actuating member engaging said contact member and normally holding said contact member in a first position but adapted to permit said contact member to assume a different position whenever said U-shaped loop experiences a predetermined deformation.

References Cited in the file of this patent

UNITED STATES PATENTS

| | | |
|---|---|---|
| 377,163 | Kendrick | Jan. 31, 1888 |
| 409,702 | Pooley et al. | Aug. 27, 1889 |
| 1,066,656 | Richardson | July 8, 1913 |
| 1,846,148 | Rumpf | Feb. 23, 1932 |
| 2,011,608 | Belknap | Aug. 20, 1935 |
| 2,232,437 | Bushman | Feb. 18, 1941 |
| 2,610,726 | Howard | Sept. 16, 1952 |
| 2,634,080 | Knobel | Apr. 7, 1953 |
| 2,660,394 | Skeuse et al. | Nov. 24, 1953 |
| 2,705,607 | Inglett | Apr. 5, 1955 |
| 2,775,425 | Engvall | Dec. 25, 1956 |
| 2,890,013 | Schieser et al. | June 9, 1959 |
| 2,930,227 | Spademan et al. | Mar. 29, 1960 |